US008612451B1

(12) United States Patent  
Wen et al.

(10) Patent No.: US 8,612,451 B1  
(45) Date of Patent: Dec. 17, 2013

(54) SEARCHING FOR DATA STRUCTURES

(75) Inventors: Jianjun Wen, San Jose, CA (US); Xinyu Tang, Cupertino, CA (US)

(73) Assignee: Google Inc., Mountain View, CA (US)

( * ) Notice: Subject to any disclaimer, the term of this patent is extended or adjusted under 35 U.S.C. 154(b) by 137 days.

(21) Appl. No.: 13/076,637

(22) Filed: Mar. 31, 2011

(51) Int. Cl.
*G06F 7/00* (2006.01)
*G06F 17/30* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06F 9/44* (2006.01)

(52) U.S. Cl.
USPC .................. 707/741; 715/209; 717/125

(58) Field of Classification Search
None
See application file for complete search history.

(56) References Cited

U.S. PATENT DOCUMENTS

| 6,038,534 | A | 3/2000 | Richards |
| 6,424,357 | B1 | 7/2002 | Frulla et al. |
| 2005/0031127 | A1 | 2/2005 | Gosior et al. |

OTHER PUBLICATIONS

Java Documentation Project—URL Shortcut for Javadocs [Date unknown, but verified via archive.org as of Aug. 7, 2004], javadocs.org, http://www.javadocs.org.*
Java™ Platform, Standard Edition 7 API Specification [date unknown], Oracle Systems, http://docs.oracle.com/javase/7/docs/api.*
Mozilla Keyboard Shortcuts Aug. 7, 2006, mozilla.org, http://www-archive.mozilla.org/docs/end-user/moz_shortcuts.html.*
Steinmates et al, How do I analyze a .hprof file? Oct. 9, 2008, stackoverflow.com, http://stackoverflow.com/questions/185893/how-do-i-analyze-a-hprof-file.*
Memory Analyzer Source Repository [date of any particular source code entry various], SVN, version 0.8, https://dev.eclipse.org/synroot/tools/org.eclipse.mat/branches/0.8.0/.*
Eclipse Memory Analyzer Screenshots [Captured by Archive.org on Mar. 5, 2010], eclipse.org, http://web.archive.org/web/20100305190030/http://www.eclipse.org/mat/about/screenshots.php.*
path_2_gc_roots.png [Captured by Archive.org on Mar. 5, 2010, eclipse.org, http://web.archive.org/web/20111106081539/http://www.eclipse.org/mat/about/path_2_gc_roots.png.*
Sundararajan, Querying Java heap with OQL Sep. 30, 2005, Oracle Sys, https://blogs.oracle.com/sundararajan/entry/querying_java_heap_with_oql.*

(Continued)

*Primary Examiner* — Jason Liao
(74) *Attorney, Agent, or Firm* — Fish & Richardson P.C.

(57) ABSTRACT

A computer-implemented method includes receiving a request to search for a data structure associated with one or more search criteria; searching, an index in a data repository, for the data structure, with the search based on the one or more search criteria; identifying, based on searching, the data structure associated with the one or more search criteria; obtaining a definition for the data structure; generating an interface that when presented on a computing device renders a representation of the definition for the data structure; and sending the interface to the computing device associated with the request to search.

19 Claims, 6 Drawing Sheets

(56) References Cited

OTHER PUBLICATIONS

Chen, How to use Eclipse Memory Analyzer to analyze JVM Memeory[sic] Issue—3 of Series "Inside JVM" Feb. 22, 2009, blogjava.net, http://www.blogjava.net/justinchen/archive/2009/02/22/256113.html.*

Releases [Date unknown], eclipse.org, http://projects.eclipse.org/projects/tools.mat/releases.* protobuf-javame [Date unknown], google.com, http://code.google.com/p/protobuf-javame/.*

MemoryAnalyzer [Captured by Archive.org on Feb. 25, 2009], eclipse.org, http://web.archive.org/web/20090225051213/http://wiki.eclipse.org/index.php/MemoryAnalyzer.*

MeCullough et al., What is your favorite open source debugging tool [closed] 9 Mar 18, stackoverflow.com, http://stackoverflow.com/questions/659780/what-is-your-favorite-open-source-debugging-tool.*

Buchen, Eclipse Memory Analyzer Release Review 0.8, May 29, 2008, eclipse.org, http://www.eclipse.org/project-slides/Galileo/MAT_Galileo_Review.pdf.*

* cited by examiner

SEARCHING FOR DATA STRUCTURES

TECHNICAL FIELD

This disclosure relates generally to searching for data structures.

BACKGROUND

A computer program can be written to store data in a field of a data structure. Additionally, the computer program can specify how data is written read from the data structure. Additionally, the data structure may reference other, different data structures, for example, to write data to the other data structures and/or to read data from the other data structures.

SUMMARY

In one aspect of the present disclosure, a computer-implemented method includes receiving a request to search for a data structure associated with one or more search criteria; searching, an index in a data repository, for the data structure, with the search based on the one or more search criteria; identifying, based on searching, the data structure associated with the one or more search criteria; obtaining a definition for the data structure; generating an interface that when presented on a computing device renders a representation of the definition for the data structure; and sending the interface to the computing device associated with the request to search.

Implementations of the disclosure can include one or more of the following features. In some implementations, the data structure includes a first data structure, and the method further includes: obtaining information indicative of one or more second data structures that are referenced by the first data structure; and updating the interface with the information indicative of the one or more second data structures that are referenced by the first data structure. In other implementations, obtaining includes parsing the definition for the first data structure; and determining, based on parsing, one or more references to the one or more second data structures in the definition.

In some implementations, the data structure includes a first data structure, and the method further includes: obtaining information indicative of one or more second data structures that reference the first data structure; and updating the interface with the information indicative of the one or more second data structures that reference the first data structure. In other implementations, the interface includes a first interface, and the method further includes: generating a second interface, with a section of the second interface including an area for insertion of the one or more search criteria; and sending the second interface to the computing device, wherein receipt of the request to search (i) is received following sending of the second interface, and (ii) includes the one or more search criteria inserted into the area of the second interface.

In still other implementations, the method further includes: generating an index for one or more data structures, wherein the one or more data structures are indexed at least partly based on one or more of (i) one or more definitions of the one or more data structures, and (ii) one or more attributes of the one or more data structures. In some implementations, the data structure includes a protocol buffer.

In still other implementations, the definition of the data structure includes information indicative of one or more of (i) a name of the data structure, (ii) names of the fields for storage of data within the data structure, and (iii) properties of the fields for storage of data. In some implementations, the actions of receiving, searching, identifying, obtaining, generating and sending are performed by one or more processors on a server-side device.

In other implementations, the search criteria includes information indicative of one or more of (i) a name of the data structure, (ii) one or more attributes of the data structure, (ii) a name of a field included in the data structure, (iv) a name of a file that includes the definition of the data structure.

In another aspect of the disclosure, a computer-implemented method includes receiving an interface including one or more input elements for the input of search criteria indicative of a requested data structure; receiving through the one or more input elements in the interface information indicative of the search criteria for the requested data structure; sending to a computing device the information indicative of the search criteria for the requested data structure; and receiving, from the computing device and based on the search criteria, an updated interface, the updated interface including a representation of a definition of the requested data structure, with the definition including information indicative of one or more qualities of the requested data structure. Implementations of this aspect of the present disclosure can include one or more of the foregoing features.

In still another aspect of the disclosure, a computer-implemented method includes receiving information indicative of a data structure to be added to an index of data structures; retrieving, based on the received information, a definition associated with the data structure; parsing the retrieved definition to determine one or more attributes of the data structure; and generating an entry in the index for the data structure, with the entry including information indicative of the attributes of the data structure. Implementations of this aspect of the present disclosure can include one or more of the foregoing features.

Implementations of the disclosure can include one or more of the following features. In some implementations, the method includes identifying the data structure using the entry in the index in response to a search request; and generating an interface for representing the definition associated with the data structure.

In other implementations, the data structure includes a first data structure, the entry includes a first entry, and the method further includes: generating temporary data indicative of the one or more attributes of the first data structure; receiving information indicative of a second data structure to be added to the index of data structures; retrieving, based on the received information for the second data structure, a definition associated with the second data structure; parsing the retrieved definition for the second data structure to generate temporary data including one or more attributes of the second data structure; aggregating the temporary data for the first data structure with the temporary data for the second data structure; removing, from the aggregated, temporary data, duplicative data; generating, using remaining, aggregated temporary data, a second entry in the index for the second data structure, with the second entry including information indicative of the attributes of the second data structure; and wherein generating the first entry in the index for the first data structure includes generating, using the remaining, aggregated temporary data, the first entry in the index for the first data structure.

In yet another aspect of the disclosure, one or more machine-readable media are configured to store instructions that are executable by one or more processing devices to perform operations including receiving a request to search for a data structure associated with one or more search criteria; searching, an index in a data repository, for the data structure, with the search based on the one or more search criteria; identifying, based on searching, the data structure associated with the one or more search criteria; obtaining a definition for the data structure; generating an interface that when presented on a computing device renders a representation of the definition for the data structure; and sending the interface to the computing device associated with the request to search. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving a request to search for a data structure associated with one or more search criteria; searching, an index in a data repository, for the data structure, with the search based on the one or more search criteria; identifying, based on searching, the data structure associated with the one or more search criteria; obtaining a definition for the data structure; generating an interface that when presented on a computing device renders a representation of the definition for the data structure; and sending the interface to the computing device associated with the request to search. Implementations of this aspect of the present disclosure can include one or more of the foregoing features.

In yet another aspect of the disclosure an electronic system includes a module configured to: receive a request to search for a data structure associated with one or more search criteria; search, an index in a data repository, for the data structure, with the search based on the one or more search criteria; and identify, based on searching, the data structure associated with the one or more search criteria; and means for obtaining a definition for the data structure; means for generating an interface that when presented on a computing device renders a representation of the definition for the data structure; and means for sending the interface to the computing device associated with the request to search. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

Advantages of the present disclosure include one or more of the following. One advantage is that an interface is provided to facilitate interaction (e.g., viewing and/or searching) with data structures. Another advantage is that the interface may provide a user with information specifying a relationship between various data structures, including, e.g., names of data structures that are referenced by a particular data structure. Still another advantage is that the interface may render a visual representation of software code defining a data structure, in which the software code is formatted to promote an ability of the user to visually distinguish among the various elements of the software code.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
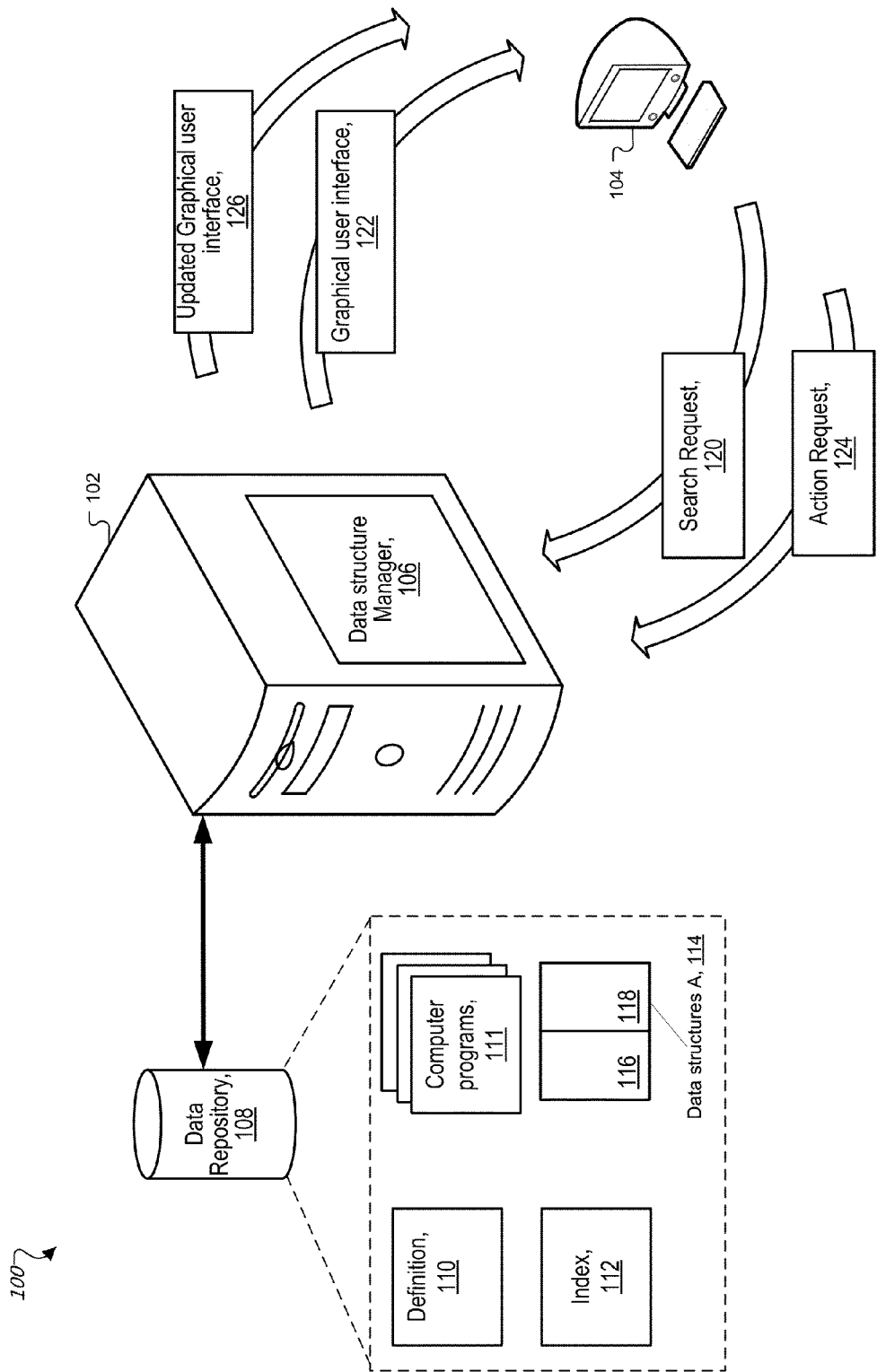
FIG. 1 is a conceptual diagram of an example system that generates a graphical user interface for searching and viewing of data structures.

A system consistent with this disclosure provides an interface that facilitates interaction with a data structure. In an example, an interaction includes a performance of an action, including, e.g., searching for data, viewing of data, reading of data, writing of data, and the like. In another example, an interface includes a mechanism for communication between a computing device and a user of the computing device. For example, an interface includes a graphical user interface, a keyboard, a monitor, and the like. In this example, an interface can facilitate interaction with a data structure by providing a graphical user interface through which a user can search for and/or view data structures, including, e.g., protocol buffers, primitive data structures, abstract data structures, composite data structures, linear data structures, lists, arrays, binary trees, graphs, and the like.

A protocol buffer can include a data structure that stores data according to a serialization format. A serialization format can include a definition of how to convert data from an original format into a compressed format for storage. A protocol buffer can include a pre-defined format for organizing and/or for storing data. The data stored in the protocol buffer can be restored to its original format by reversely applying the serialization format to decompress the data.

The protocol buffer can include an interface that is based on an interface description language ("IDL"). An IDL can include a software language for generating an interface that is language-neutral. IDL can promote communication between two software components that can be written in different languages, for example, between a component written in the C++® programming language and a component written in the Java® programming language. Through an IDL-based interface, the protocol buffer can be accessed by software components written in different languages.

In an example, the protocol buffer can provide a stable, compressible, backward compatible framework for the storage of data. In this example, the protocol buffer can be used for the transfer of data, where transferring data includes transferring data between clients and servers, between servers, between processes, between different storage devices, and the like.

In another example, the protocol buffer can be defined from source code associated with several programming languages. In still another example, the protocol buffer can be instantiated with different data values. Additionally, numerous, different protocol buffer definitions can exist. For example, a protocol buffer definition can define a protocol buffer that is nested within another protocol buffer. Another protocol buffer definition can define a protocol buffer that includes other protocol buffer as its fields.

While data structures are generally referenced in the below examples, the techniques described herein are also equally applicable to protocol buffers and other types of data structures.

In an example, a user of the system can use the graphical user interface to view a definition of a data structure. In this example, a user wants to view the definition of the data structure to use the definition as a template from which to build a new, different data structure. In another example, a user wants to view the definition of the data structure to identify software functions that are being called from within the data structure. In still another example, the user wants to view the definition to view the fields of the data structure. The data structure can include fields for the storage of data. A field can include an element of a data structure in which one or more items of data are stored. A field of a data structure can be populated with a value, for example, when data is stored in the field.

A definition can include information describing qualities of the data structure. In an example, the definition of the data structure can include (i) a name of the data structure, (ii) names of the fields for storage of data within the data structure, and (iii) properties of the fields for storage of data, including, e.g., a type of data that can be stored in a field, a size constraint for the type of data that can be stored in the field, information specifying whether the field is an optional field (e.g., a field that can be populated with data), information specifying whether the field is a mandatory field (e.g., a field that is required to be populated with data), and the like.

The data structure also can be associated with attributes. An attribute can include information specifying a characteristic of the data structure that can be independent from the definition of the data structure. In an example, attributes of a data structure can include names of other data structure referenced by the data structure, names of other data structure that reference the data structure, and names of computer programs that reference the data structure. A reference can include a pointer from one data structure to another data structure.

In an example, a data structure ("data structure A") both references and is referenced by other data structures. In this example, data structure A retrieves data from another, different data structure ("data structure B"). To retrieve the data, data structure A references data structure B from within data structure A.

In this example, yet another data structure ("data structure C") writes data to data structure A. To write data to data structure A, data structure C references data structure A.

In an example, the system can obtain the definitions of data structures and can determine the attributes of the data structures. Using the obtained definitions and the determined attributes, the system can generate an index of the data structures. In this example, the data structures can be indexed based on the names of the data structures.

A user of the system can search for a data structure in the index, for example, based on the name of the data structure. The system can use the index to access the definition of the data structure and the attributes of the data structure. In this example, the system can generate a graphical user interface that displays for the user the definition of the data structure and a list of at least some of the attributes of the data structure, including, e.g., names of other data structures referenced by the data structure, names of other data structures that reference the data structure, and the like.

In another example, the graphical user interface can also provide the user with controls through which the user can request that the system perform an action using the definition displayed in the graphical user interface. In this example, controls include links and/or buttons that are selectable by the user to indicate the action that the user is requesting the system perform. In an example, the system generates a graphical user interface to display a visual image of a data structure. In this example, the graphical user interface includes a link, selection of which causes the graphical user interface to display the definition of the data structure.

In another example, the requested action can include generating an instance of the data structure, highlighting keywords within the definition of the data structure, and the like, as described in further detail below. An instance can include an object that has been generated by execution of a computer program. In an example, an instance of a data structure can include a version of the data structure that has been generated by execution of the definition of the data structure.

FIG. 1 is a conceptual diagram of example system 100 that generates a graphical user interface for the searching and the viewing of data structures. System 100 can include server 102 and client device 104. Server 102 can include data structure manager 106 that can be configured to generate index 112 for data structures. Data structure manager 106 also can be configured to generate graphical user interface 122 through which a user of client device 104 can search for data structures.

System 100 also can include data repository 108 that can be configured to store data structures 114. In the example of FIG. 1, data structure 114 includes fields 116, 118 and is associated with a name of "data structure A." Data repository 108 can be configured to store definition 110 of data structure 114. Data repository 108 also can be configured to store computer programs 111, including, e.g., e-mail applications, video game applications, web browser applications, music applications, and the like. Computer programs 111 can include computer programs that reference data structure 114 associated with definition 110. Data repository 108 can additionally be configured to store index 112. Although FIG. 1 depicts various elements, system 100 can include fewer or more elements than what is shown, and functionality of the depicted elements can overlap and/or exist in fewer or more elements.

In the example of FIG. 1, client device 104 can send search request 120 to server 102. Search request 120 can include a request for a graphical user interface through which a user can search for data structures. In response to search request 120, data structure manager 106 can send graphical user interface 122 to client device 104. In the example of FIG. 1, graphical user interface 122 can include a graphical user interface through which a user can search for data structures, including, e.g., definitions of data structures.

In the example of FIG. 1, a user of client device 104 can use graphical user interface 122 to request performance of an action, including, e.g., searching for data structures. In an example, the user enters into graphical user interface 122 the name (e.g., "data structure A") of data structure 114 and requests that a search be performed for definition 110 associated with data structure 114. Using the requested action for a search, client device 104 can generate action request 124 and can send action request 124 to data structure manager 106. Action request 124 can include a request for information that is responsive to the requested action. In an example, action request 124 includes a request to search for definition 110 of data structure 114 and for attributes associated with data structure 114.

In response to action request 124, data structure manager 106 can perform the requested action, including, e.g., searching index 112 for a data structure (e.g., data structure 114) matching the name of the data structure (e.g., "data structure A") entered into graphical user interface 122. Data structure manager 106 can locate in index 112 an entry for data structure 114. In an example, index 112 can include a list of data structures referenced by data structure 114. Index 112 can also include a list of data structures that reference data structure 114.

In an example, the entry in index 112 can include information specifying a location at which definition 110 for data structure 114 is stored in data repository 108. Using the location of definition 110, data structure manager 106 can access definition 110 for data structure 114. In this example, data structure manager 106 can generate updated graphical user interface 126 and can send updated graphical user interface 126 to client device 104. Updated graphical user interface 126 can include a graphical user interface that displays the results of the search for data structures. Updated graphical user interface 126 can include information indicative of definition 110 of data structure 114. Updated graphical user interface 126 can also include the attributes of data structure 114 In this example, the attributes displayed in updated graphical user interface 126 can include data structures referenced by data structure 114 and/or data structures that reference data structure 114.

Figure 2:
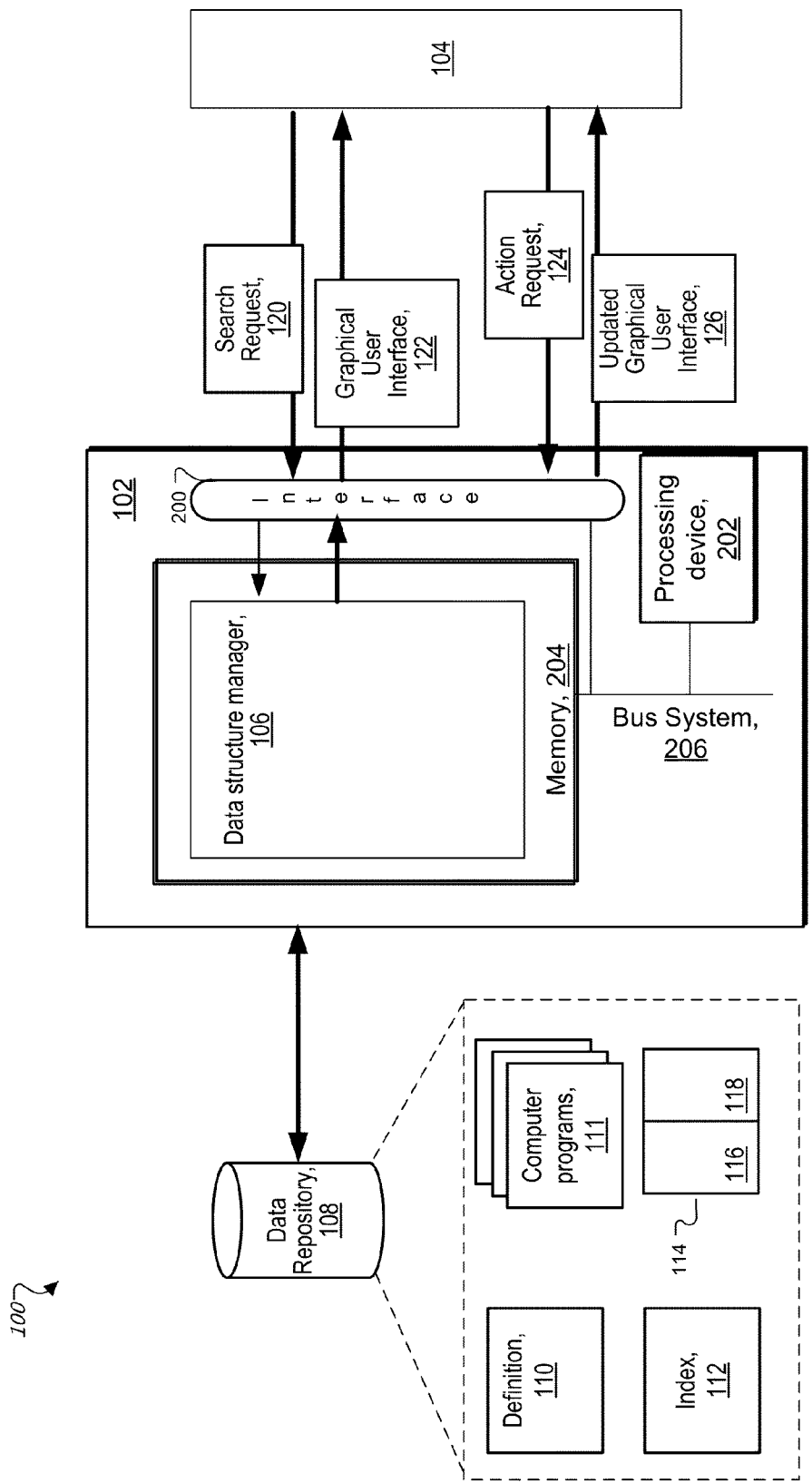
FIG. 2 is a block diagram of example components of a system that generates a graphical user interface for the viewing and the searching of data structures.

FIG. 2 is a block diagram of example components of example system 100 that generates a graphical user interface for the viewing and the searching of data structures.

Client device 104 can be any computing device capable of taking input from a user and communicating over a network (not shown) with server 102 and/or with other client devices. For example, client device 104 can be a mobile device, a desktop computer, a laptop, a cell phone, a personal digital assistant ("PDA"), a server, an embedded computing system, a mobile device, and the like. Although a single client device 104 is shown in FIGS. 1 and 2, system 100 can include a plurality of client devices, which may be geographically dispersed.

Server 102 can be any of a variety of computing devices capable of receiving information and running one or more services, which may be accessed by client device 104. In an example, server 102 includes a server, a distributed computing system, a desktop computer, a laptop, a cell phone, a rack-mounted server, and the like. Server 102 can be a single server or a group of servers that are at a same location or at different locations. Client device 104 and server 102 can run programs having a client-server relationship to each other. Although distinct modules are shown in the figures, in some examples, client and server programs can run on the same device.

Server 102 can receive information from client device 104 via input/output ("I/O") interface 200. I/O interface 200 can be any type of interface capable of receiving information over a network, such as an Ethernet interface, a wireless networking interface, a fiber-optic networking interface, a modem, and the like. Server 102 also includes processing device 202 and memory 204. Bus system 206, including, for example, a data bus and a motherboard, can be used to establish and to control data communication between the components of server 102.

Processing device 202 can include one or more microprocessors. Processing device 202 can include any appropriate processor and/or logic that is capable of receiving and storing data, and of communicating over a network (not shown). Memory 204 can include a hard drive and a random access memory storage device, such as a dynamic random access memory, or other types of non-transitory machine-readable storage devices. As shown in FIG. 2, memory 204 can store computer programs that are executable by processing device 202. These computer programs include data structure manager 106, which is described in further detail below.

Data structure manager 106 can be implemented in software running on a computer device (e.g., server 102), hardware or a combination of software and hardware. Although manager 106 is shown as a single module in FIGS. 1 and 2, the functionality of data structure manager 106 may exist in one or more modules, which may be distributed and coupled by one or more networks (not shown).

Data structure manager 106 can be configured to generate graphical user interface 122 and updated graphical user interface 126. As previously described, graphical user interface 122 can include a graphical user interface through which a user of client device 104 can search for data structures. Updated graphical user interface 126 can include a graphical user interface that displays the results of the search for data structures.

In an example, data structure manager 106 also can be configured to generate a graphical user interface (not shown) through which a user can enter a new data structure into index 112. In this example, the user can enter into the graphical user interface the definition of the new protocol, a location of the files including the definition of the new data structure, a name of the new data structure, and the like. Data structure manager 106 can retrieve from the specified location the files for the new data structure and stores the files in data repository 108. Using the techniques described below, data structure manager 106 can be configured to use the definition of the new data structure to generate an entry for the new data structure in index 112.

As previously described, data structure manager 106 can be configured to generate index 112, for example, from definition 110 of data structure 114. In an example, data structure manager 106 can access definition 110 from data repository 108. Using definition 110 for data structure 114, data structure manager 106 can determine (i) the name of data structure 114, namely, data structure A, (ii) fields 116, 118 for storage of data within data structure 114, and (iii) names of fields 116, 118 for storage of data within data structure 114. Data structure manager 106 can use some or all of this information in generating an entry for data structure 114 in index 112.

Data structure manager 106 also can be configured to determine attributes of data structure 114. In an example, data structure manager 106 can parse definition 110 of data structure 114 to determine data structures (e.g., "data structure B") referenced by data structure 114. Data structure manager 106 can also parse other definitions of other data structures to determine data structures (e.g., "data structure C") that include references to data structure 114. Data structure manager 106 can also parse computer programs 111 to determine an identity of one of more computer programs that include references to data structure 114.

Data structure manager 106 can be configured to index data structure 114 based on definition 110 of data structure 114 and/or based on one or more of the attributes of data structure 114, as illustrated in the below Table 1.

TABLE 1

| Name | Location | Referenced By | References |
|---|---|---|---|
| Data structure A | 01001110 | Data structure B | Data structure C |

The above Table 1 includes an example of an entry from index 112 in which data structure 114 is indexed. As illustrated in the above Table 1, data structure 114 can be indexed based on the name of data structure 114, namely "data structure A," as indicated in the "Name" column. The "Location" column of Table 1 includes information specifying a location (e.g., 01001110) in data repository 108 in which definition 110 of data structure 114 is stored.

As illustrated in the above Table 1, data structure 114 also can be indexed based on a name of a data structure (e.g., data structure B) that is referenced by data structure 114, e.g., as indicated by the "Referenced By" column. Data structure 114 also can be indexed based on a name of a data structure (e.g., data structure C) that references data structure 114, e.g., as indicated by the "References" column. In another example, data structure 114 can be indexed based on various other information, including, e.g., names of files that include definition 110, comments included in definition 110, terms and/or words included in definition 110, and the like.

Data structure manager 106 can be configured to perform an action specified by action request 124, as described below. In an example, data structure manager 106 can be configured to perform an action of searching for data structure 114. Data structure manager 106 can be configured to search for data structure 114 based on the full name of data structure 114 (e.g., "data structure A") or based on a partial name of data structure 114 (e.g., "proto A").

Data structure manager 106 also can be configured to search for data structure 114 based on names of fields (e.g., fields 116, 118) associated with data structure 114. A search based on the names of fields can include a full name search and/or a partial name search. Data structure manager 106 can also be configured to insert into updated graphical user interface 126 information associated with data structure 114, including, e.g., results of the search.

Data structure manager 106 also can be configured to retrieve definition 110 of data structure 114 from data repository 108. Data structure manager 106 can format definition 110 by indenting various portions of definition 110, highlighting keywords in definition 110, and/or color coding information specifying fields 116, 118 in definition 110. As previously described, fields 116, 118 in data structure 114 can include optional fields and/or mandatory fields.

In an example, data structure manager 106 can format definition 110 by highlighting keywords in a blue color, highlighting optional fields in a yellow color and highlighting mandatory fields in a green color. In this example, data structure manager 106 additionally can format definition 110 to appear in a pop-up window in updated graphical user interface 126, for example, when a user clicks on a link or on a button in updated graphical user interface 126 to view definition 110.

Data structure manager 106 also can be configured to search data repository 108 using fields included in data structures. In an example, data structure manager 106 can return to client device 104 a graphical user interface that displays a listing of the fields associated with various data structures. In this example, data structure manager 106 can configure the graphical user interface such that a selection of a field by a user causes data structure manager 106 to send to client device 104 a definition of the data structure associated with the selected field.

Data structure manager 106 also can be configured to search for data structures referenced by data structure 114 and/or data structures that reference data structure 114. As previously described, data structure manager 106 can search for data structures referenced by data structure 114 by parsing definition 110 for references to other data structures. Additionally, data structure manager 106 can search for other data structures that reference data structure 114 by parsing definitions of the other data structures for references to data structure 114.

Data structure manager 106 also can be configured to generate an instance of data structure 114, for example, following selection of a link in updated graphical user interface 126 that generates a request for the instance of data structure 114. In an example, data structure manager 106 can be configured to send to client device 104 another graphical user interface (not shown) that renders a visual representation of the instance of data structure 114.

In an example, data structure manager 106 can be configured to generate a data structure instance viewer that displays a visual representation of the instance of data structure 114. In this example, updated graphical user interface 126 can include an area into which a user can insert definition 110 of data structure 114. Following insertion of definition 110 into the area, data structure manager 106 can send to client device 104 another graphical user interface (not shown) that renders a visual representation of the instance of data structure 114. In this example, the instance of data structure 114 can be formatted with indentations and highlighting, as previously described. Additionally, when the user selects a visual representation of a field in data structure 114, data structure manager 106 can send to client device 104 information related to the selected field, including, e.g., information specifying whether the field is an optional field or a mandatory field, information specifying a unique identifier for the field, information specifying a name of the field, and the like.

Figure 3:
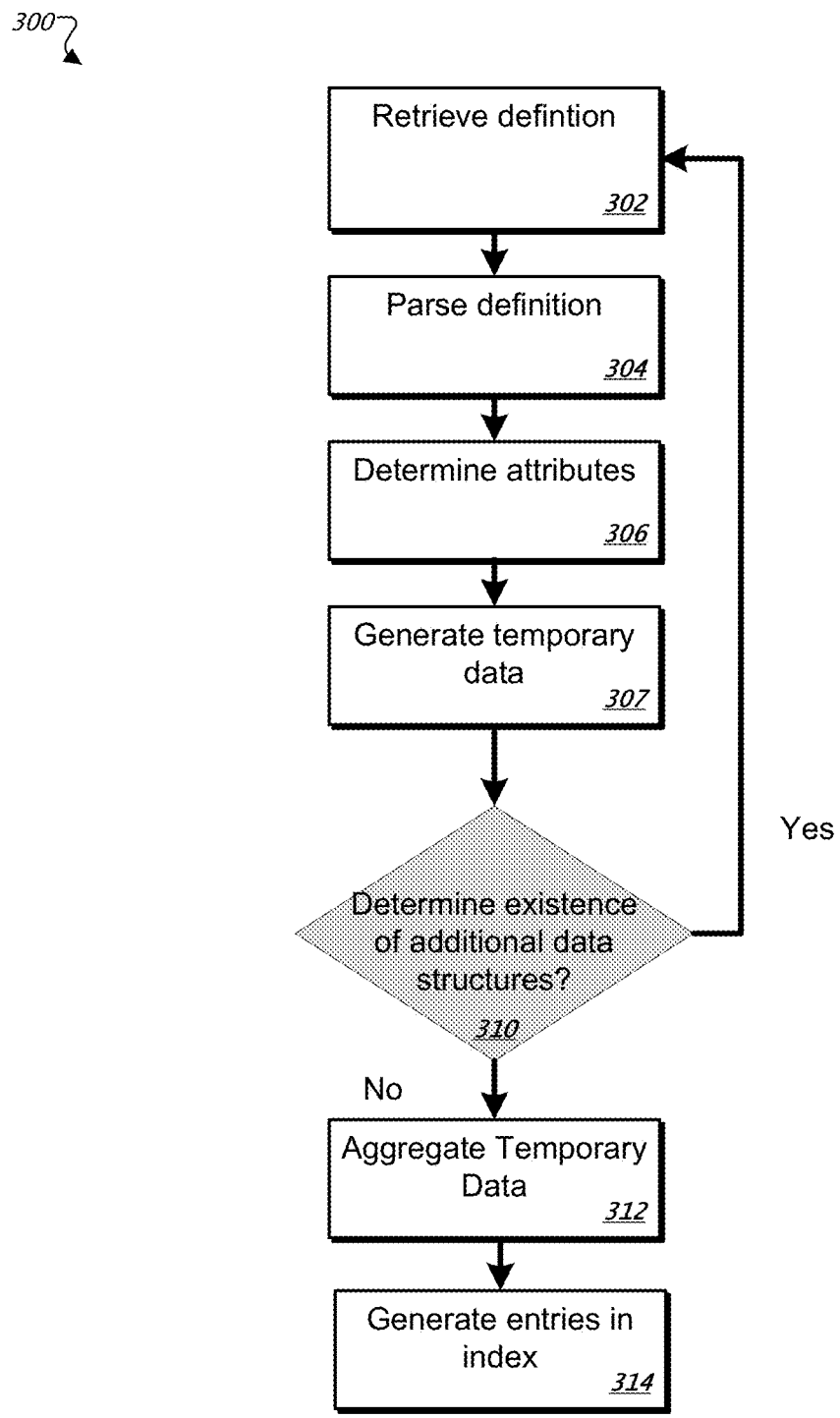
FIG. 3 is a flow chart of an example process for indexing a data structure.

FIG. 3 is a flow chart of an example process 300 for indexing data structure 114. In operation, data structure manager 106 can retrieve (302) from data repository 108 definition 110 for data structure 114. Data structure manager 106 can parse (304) definition 110 to determine the qualities of data structure 114. In an example, data structure manager 106 can parse definition 110 to determine (i) a name of data structure 114 (e.g., "data structure A"), (ii) name of fields 116, 118 for storage of data within data structure 114, and (iii) properties of fields 116, 118 for storage of data.

Data structure manager 106 also can determine (306) the attributes of data structure 114, including, e.g., data structures (e.g., "data structure B") referenced by data structure 114, data structures (e.g., "data structure C") that reference data structure 114, and computer programs 111 that reference data structure 114, as previously described.

Data structure manager 106 can also generate (306) temporary data for data structure 114. Temporary data can include data that is generated by data structure manager 106 at a certain point in time (e.g., as data structure manager 106 is parsing definition 110 and determining attributes). The temporary data is aggregated together at a later point in time, for example, following completion of parsing of definition 110 and determining of attributes, and stored in data repository 108. In an example, data structure manager 106 generates the temporary data, rather than storing the data as definition 110 is parsed, to increase an ability of data structure manager 106 to format the parsed data as a whole and to increase an ability of data structure manager 106 to remove duplicative temporary data and/or duplicative data structures, e.g., prior to storage of the data in data repository 108.

In an example, temporary data can include information indicative of words (e.g., terms, comments, and the like) included in a data structure, a substring of a word included in data structure 114, a number of times a word appears in the data structure (e.g., a term frequency of a word), a position of a word in a data structure, and the like.

Data structure manager 106 can determine (310) whether there are additional data structures included in data repository 108 for indexing in index 112. When data structure manager 106 determines that there are additional data structures included in data repository 108 for indexing in index 112, data structure manager 106 can be configured to repeat the performance of actions 302, 304, 306, 307. In an example, data structure manager 106 can be configured to perform actions 302, 304, 306, 307 until data structure manager 106 has performed actions 302, 304, 306, 307 on all the data structures stored in data repository 108.

When data structure manager 106 determines that there are no additional data structures included in data repository 108 for indexing in index 112, data structure manager 106 can aggregate (312) together the temporary data for the data structures. As previously described, data structure manager 106 can be configured to generate temporary data for data structure 114 by determining words included in data structure 114. In this example, each piece of temporary data is associated, with a particular word included in data structure 114.

To aggregate together the temporary data, data structure manager 106 can be configured to aggregate together each piece of temporary data associated with data structure 114. By aggregating together the pieces of temporary data for data structure 114, data structure manager 106 can generate a compilation of all words included in data structure 114. In this example, data structure manager 106 can be configured to store in data repository 106 the aggregated temporary data.

Data structure manager 106 can generate (308) entries in index 112 for the data structures (e.g., data structure 114), for example, as illustrated in the above Table 1. As previously described, data structure 114 can be indexed in index 112 in numerous ways, including, e.g., (i) based on the name of data structure 114, e.g., as indicated in the "Name" column of Table 1, (ii) based on data structures referenced by data structure 114, e.g., as indicated in the "Referenced by" column of Table 1, (iii) based on data structures that reference data structure 114, e.g., as indicated in the "References" column of Table 1, (iv) based on an aggregation of temporary data, and the like. In an example, a single data structure (e.g., data structure 114) can be associated with multiple entries in an index.

In an example, process 300 can be performed for all data structures stored in data repository 108 prior to a search for data structures by data structure manager 106. In another example, data structure manager 106 may be configured to perform action 314 of generating entries in index 112 following action 306. In this example, the entries in index 112 can be updated following action 307 and/or following action 312.

In another example, a word (and/or a substring thereof) can have an entry in index 112. In this example, the word (e.g., entered in index 112) can have attributes associated with the word, including, e.g., which data structures the word is included in, a position of the word within the data structure, a term frequency for the word, and the like. In another example, data structure manager 106 can be configured to calculate a measure of word importance. In this example, data structure manager 106 includes the measure of word importance in the attributes for the word.

In an example, the measure of word importance includes a term frequency—inverse document frequency ("tf-idf") score for a word. Tf-idf can include a statistical measure that evaluates how important a word is to a document in a collection or corpus. The importance of the word increases proportionally to the number of times a word appears in the document but is offset by the frequency of the word in the corpus. In an example, tf-idf can be used to evaluate the importance of a word to the data structures stored in data repository 108.

Figure 4:
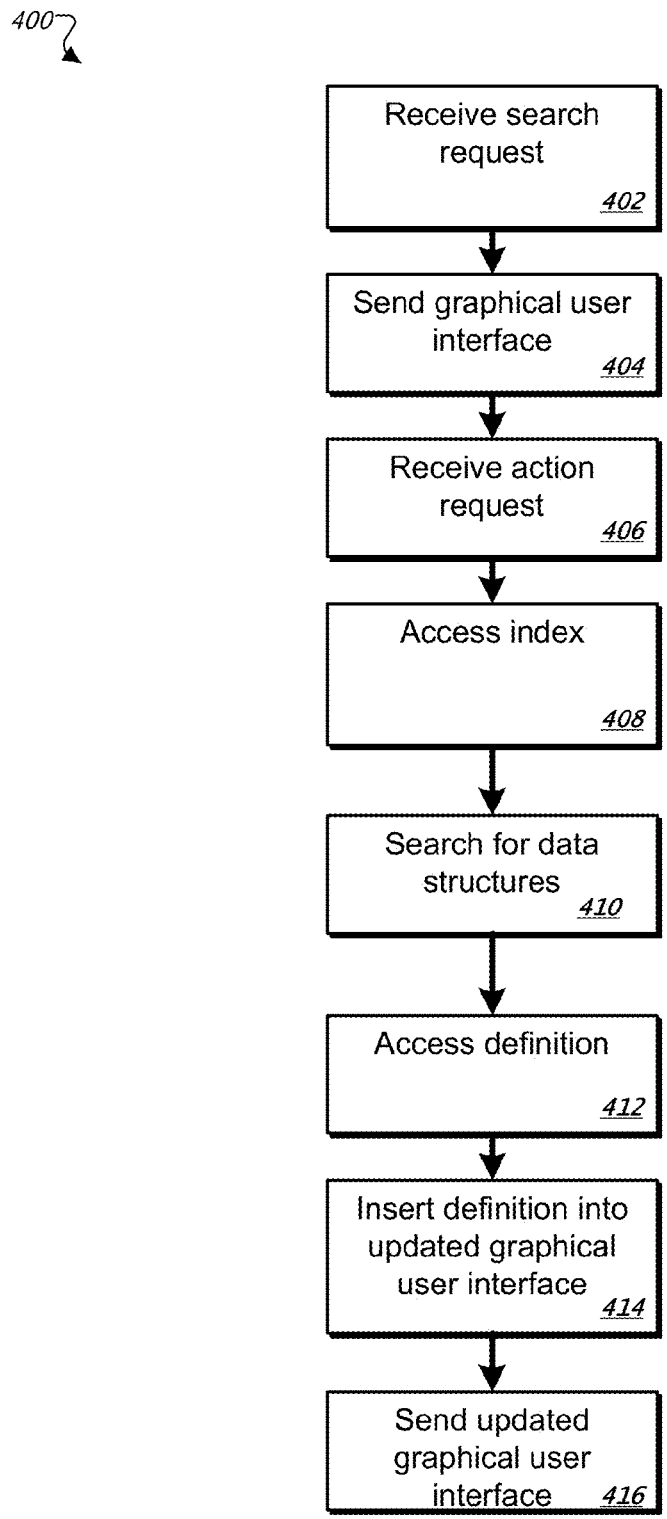
FIG. 4 is a flow chart of an example process for generating an updated graphical user interface.

FIG. 4 is a flow chart of an example process 400 for generating updated graphical user interface 126. In operation, data structure manager 106 can receive (402) search request 120 from client device 104. In response to search request 120, data structure manager 106 can send (404) graphical user interface 122 to client device 104. As previously described, a user of client device 104 can use graphical user interface 122 to search for data structures, including, e.g., data structure 114.

In an example, the user enters into graphical user interface 122 various search criteria to be used in searching for data structures. In this example, search criteria can include a name of a data structure, attributes of the data structure, names of fields included in the data structure, name of files that include the definition of the data structure, and the like. Data structure manager 106 can receive (406) action request 124, which includes (i) information specifying the search criteria to be used in searching for data structures, and (ii) the action to be performed by data structure manager 106, including, e.g., an action of searching for data structures.

Data structure manager 106 can access (408) index 112. Using the search criteria included in action request 124, data structure manager 106 can search (410) for data structures associated with definitions and/or attributes matching the search criteria. Following identification of data structure 114 as matching the search criteria, data structure manager 106 can access (412) definition 110 for data structure 114, for example, using the location of data structure 114 included in index 112.

Data structure manager 106 can insert (414) a visual representation of definition 110 into updated graphical user interface 126. Data structure manager 106 can also insert into updated graphical user interface 126 attributes of data structure 114, including, e.g., data structures referenced by data structure 114 as specified in index 112 (e.g., "Referenced by" column in Table 1), and data structures that reference data structure 114 as specified in index 112 (e.g., "References" column in Table 1). Data structure manager 106 can send (416) updated graphical user interface 126 to client device 104.

Figure 5:
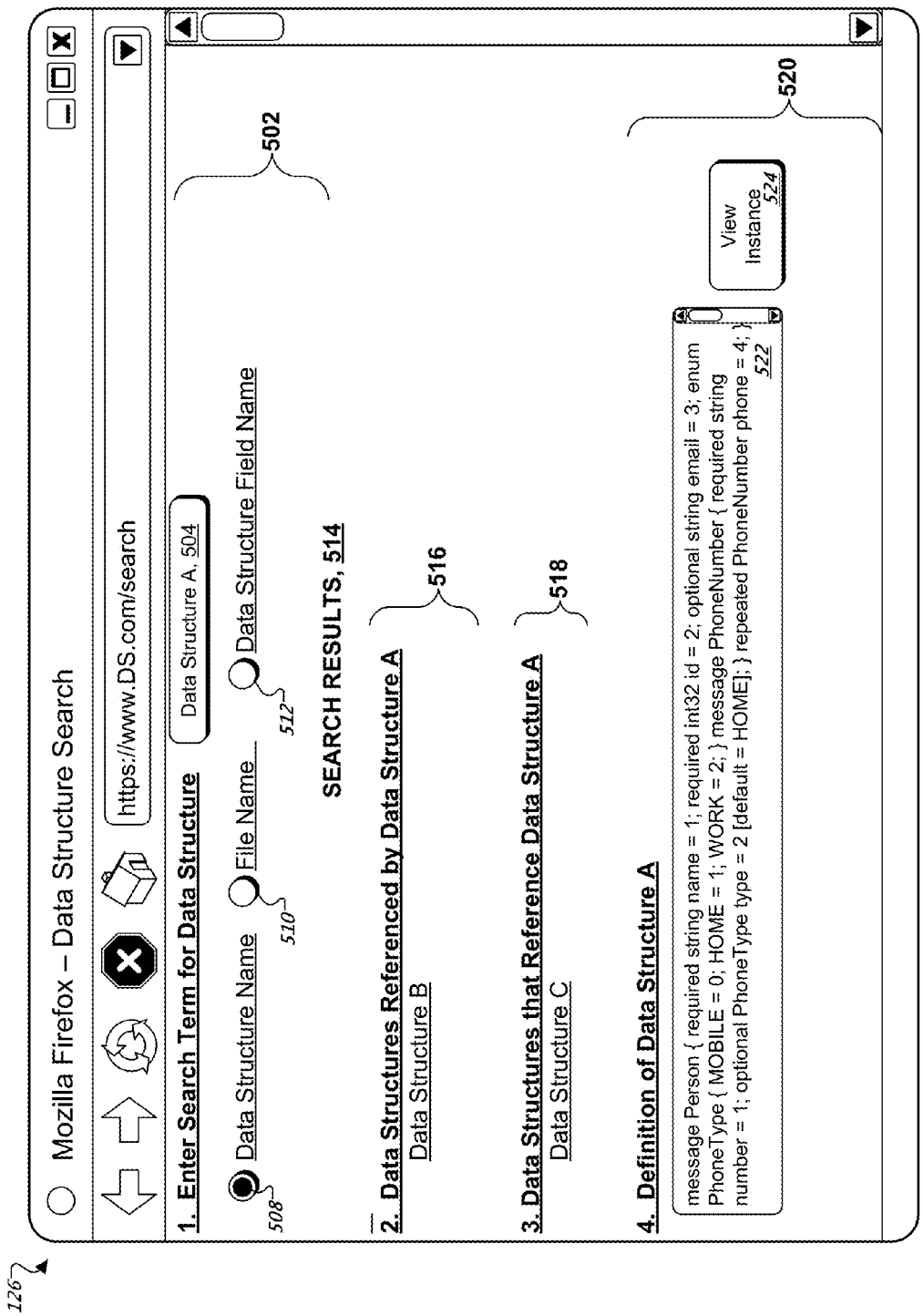
FIG. 5 is a diagram of an example of an updated graphical user interface.

FIG. 5 is a diagram of updated graphical user interface 126. In the example of FIG. 5, updated graphical user interface 126 can include section 502 into which a user can enter the search criteria to be used by data structure manager 106 in searching for data structures. Section 502 can include text box 504 and selectable buttons 508, 510, 512. A user can enter into an input element of the interface search criteria (e.g., word(s)) to be used in searching for data structures.

In the example of FIG. 5, the input element includes text box 504 into which the user inputs search criteria. In another example, the input element includes an audio recorder (e.g., a microphone). In this example, a user uses the audio recorder to input search criteria that are sent to server 102. In this example, client device 104 includes a speech-to-text application to convert the received audio input into a data file (e.g., a text file) that is sent to server 102. Other examples of input elements include a touch screen monitor, a video-input device, and the like, through which client device 104 can capture information indicative of search criteria to be used in searching for data structures, In the example of FIG. 5, a user can select one of selectable buttons 508, 510, 512 to indicate a type of the search criteria to be used in searching for data structures. Selectable button 508 indicates that the search criteria entered into text box 504 is indicative of a name of a data structure. Selectable button 510 indicates that the search criteria entered into text box 504 is indicative of a file name that includes a definition of a data structure. Selectable button 512 indicates that the search criteria entered into text box 504 is indicative of a name of fields in a data structure.

In an example, graphical user interface 122 (not shown) can include text box 504 and selectable fields 508, 510, 512 to allow a user to search for data structures. As previously described, after a user has initiated a search for data structures, data structure manager 106 can generate updated graphical user interface 126 to display results of the search for the user. In the example of FIG. 5, text box 504 and selectable fields 508, 510, 512 are also included in updated graphical user interface 126 to provide the user with a visual reminder of the search criteria that were used in generating the search results.

Graphical user interface 126 can include section 514, which displays the search results. In the example of FIG. 5, data structure 114 matches the search criteria entered into section 502 of graphical user interface 126.

Graphical user interface 126 can include section 516, which includes information specifying a data structure (e.g., "data structure B") that is referenced by data structure 114. Graphical user interface 126 can include section 518, which includes information specifying a data structure (e.g., "data structure C") that references data structure 114.

Graphical user interface 126 also can include section 520, which displays information indicative of definition 110 of data structure 114. Section 520 can include display box 522, which displays a visual representation of the computer code for definition 110. Section 520 also can include selectable area 524, which when selected causes client device 104 to send a request to data structure manager 106 to generate an instance of data structure 114. As previously described, data structure manager 106 can be configured to generate the instance of data structure 114 and to send to client device 104 a visual representation of the generated instance (not shown).

The particular configuration of graphical user interface 126 is an example only, and graphical user interface 126 can be configured in various ways depending on the application and context. Further, the particular user interface elements described in connection with graphical user interface 126 are examples only, and graphical user interface 126 can include various other user interface elements, including, e.g., dynamic elements, static elements, dropdown boxes, selectable portions of text, icons, menus, tabs, and the like. Graphical user interface 126 can include fewer or more elements than what is shown in FIG. 5.

Using the techniques described herein, data structure manager 106 can be configured to index data structures, for example, based on definitions of the data structures and/or based on attributes of the data structures. Data structure manager 106 also can be configured to search for data structures and to generate a graphical user interface for the display of visual representations of the data structures. While the examples provided herein are primarily with regard to data structures, the techniques described herein are applicable to other types of data structures, including, e.g., arrays, lists, binary trees, hashes, graphs, and the like.

Figure 6:
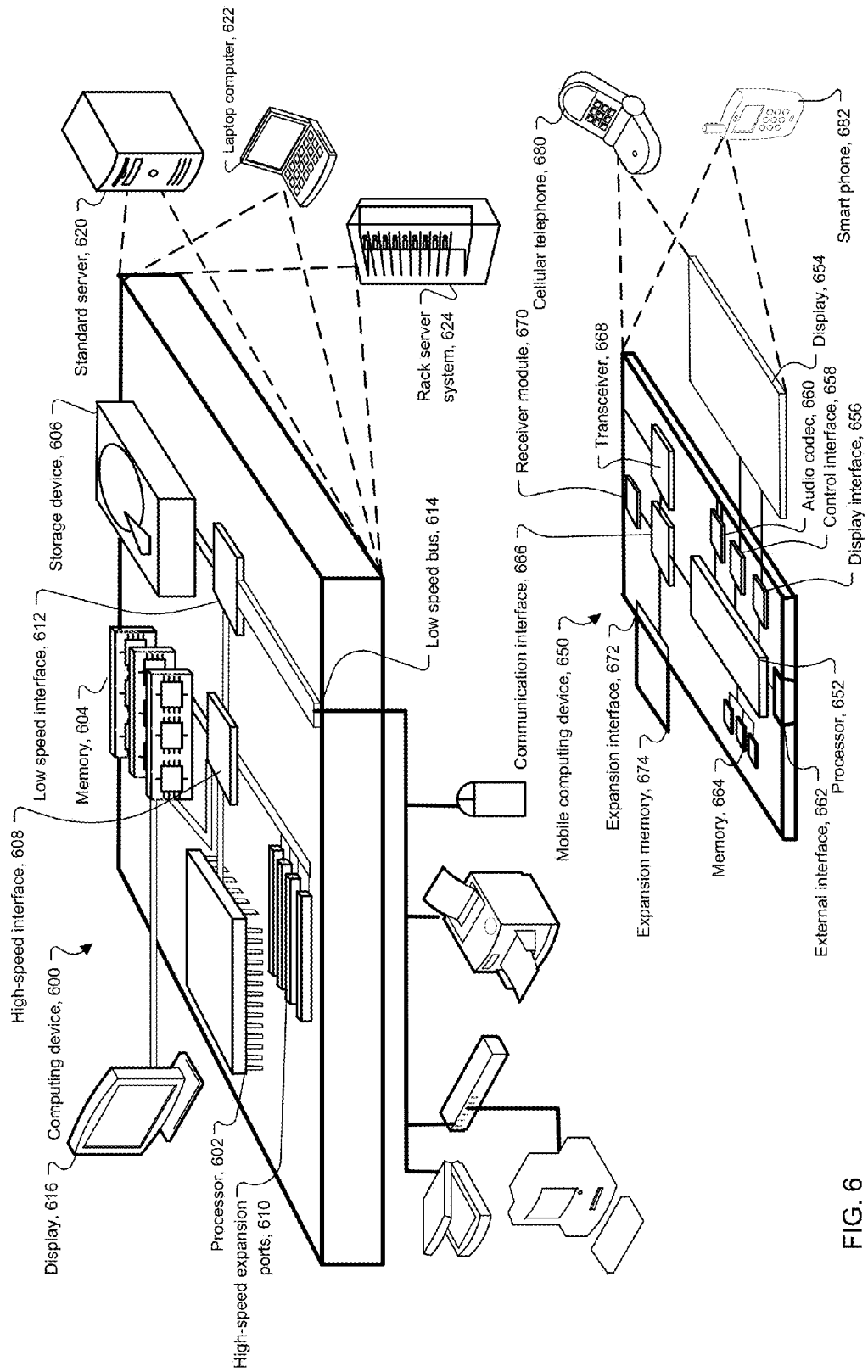
FIG. 6 shows an example of a computer device and a mobile computer device that can be used to implement the techniques described herein.

FIG. 6 shows an example of computer device 600 and an example of mobile computer device 650, which can be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes processor 602, memory 604, storage device 606, high-speed interface 608 connecting to memory 604 and high-speed expansion ports 610, and low speed interface 612 connecting to low speed bus 614 and storage device 606. Each of components 602, 604, 606, 608, 610, and 612, are interconnected using various busses, and can be mounted on a common motherboard or in other manners as appropriate. Processor 602 can process instructions for execution within computing device 600, including instructions stored in memory 604 or on storage device 606 to display graphical information for a graphical user interface on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

Memory 604 stores information within computing device 600. In one implementation, memory 604 is a volatile memory unit or units. In another implementation, memory 604 is a non-volatile memory unit or units. Memory 604 also can be another form of computer-readable medium, such as a magnetic or optical disk.

Storage device 606 is capable of providing mass storage for computing device 600. In one implementation, storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product also can contain instructions that, when executed, perform one or more methods, such as those described above. The information carrier is a computer- or machine-readable medium, such as memory 604, storage device 606, memory on processor 602, and the like.

High-speed controller 608 manages bandwidth-intensive operations for computing device 600, while low speed controller 612 manages lower bandwidth-intensive operations. Such allocation of functions is an example only. In one implementation, high-speed controller 608 is coupled to memory 604, display 616 (e.g., through a graphics processor or accelerator), and to high-speed expansion ports 610, which can accept various expansion cards (not shown). In the implementation, low-speed controller 612 is coupled to storage device 606 and low-speed expansion port 614. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 600 can be implemented in a number of different forms, as shown in the figure. For example, it can be implemented as standard server 620, or multiple times in a group of such servers. It also can be implemented as part of rack server system 624. In addition or as an alternative, it can be implemented in a personal computer such as laptop computer 622. In some examples, components from computing device 600 can be combined with other components in a mobile device (not shown), such as device 650. Each of such devices can contain one or more of computing device 600, 650, and an entire system can be made up of multiple computing devices 600, 650 communicating with each other.

Computing device 650 includes processor 652, memory 664, an input/output device such as display 654, communication interface 666, and transceiver 668, among other components. Device 650 also can be provided with a storage device, such as a microdrive or other device, to provide additional storage. Each of components 650, 652, 664, 654, 666, and 668, are interconnected using various buses, and several of the components can be mounted on a common motherboard or in other manners as appropriate.

Processor 652 can execute instructions within computing device 650, including instructions stored in memory 664. The processor can be implemented as a chipset of chips that include separate and multiple analog and digital processors. The processor can provide, for example, for coordination of the other components of device 650, such as control of user interfaces, applications run by device 650, and wireless communication by device 650.

Processor 652 can communicate with a user through control interface 658 and display interface 656 coupled to display 654. Display 654 can be, for example, a TFT LCD (Thin-Film-Transistor Liquid Crystal Display) or an OLED (Organic Light Emitting Diode) display, or other appropriate display technology. Display interface 656 can comprise appropriate circuitry for driving display 654 to present graphical and other information to a user. Control interface 658 can receive commands from a user and convert them for submission to processor 652. In addition, external interface 662 can communicate with processor 642, so as to enable near area communication of device 650 with other devices. External interface 662 can provide, for example, for wired communication in some implementations, or for wireless communication in other implementations, and multiple interfaces also can be used.

Memory 664 stores information within computing device 650. Memory 664 can be implemented as one or more of a computer-readable medium or media, a volatile memory unit or units, or a non-volatile memory unit or units. Expansion memory 674 also can be provided and connected to device 650 through expansion interface 672, which can include, for example, a SIMM (Single In Line Memory Module) card interface. Such expansion memory 674 can provide extra storage space for device 650, or also can store applications or other information for device 650. Specifically, expansion memory 674 can include instructions to carry out or supplement the processes described above, and can include secure information also. Thus, for example, expansion memory 674 can be provide as a security module for device 650, and can be programmed with instructions that permit secure use of device 650. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as memory 664, expansion memory 674, memory on processor 652, that can be received, for example, over transceiver 668 or external interface 662.

Device 650 can communicate wirelessly through communication interface 666, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, WiFi, or other such transceiver (not shown). In addition, GPS (Global Positioning System) receiver module 670 can provide additional navigation- and location-related wireless data to device 650, which can be used as appropriate by applications running on device 650.

Device 650 also can communicate audibly using audio codec 660, which can receive spoken information from a user and convert it to usable digital information. Audio codec 660 can likewise generate audible sound for a user, such as through a speaker, e.g., in a handset of device 650. Such sound can include sound from voice telephone calls, can include recorded sound (e.g., voice messages, music files, and the like) and also can include sound generated by applications operating on device 650.

Computing device 650 can be implemented in a number of different forms, as shown in the figure. For example, it can be implemented as cellular telephone 680. It also can be implemented as part of smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A display screen, such as an LCD or a CRT displays, to a user, images that are generated by a client including, but not limited to, the graphical user interfaces herein. As is well known, display on a display screen (e.g., a monitor) physically transforms the display screen. For example, if the display screen is LCD-based, the orientation of liquid crystals can be changed by the application of biasing voltages in a physical transformation that is visually apparent to the user. As another example, if the display screen is a CRT, the state of a fluorescent screen can be changed by the impact of electrons in a physical transformation that is also visually apparent.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the processes and techniques described herein. A number of implementations have been described. Nevertheless, it will be understood that various modifications can be made without departing from the spirit and scope of the processes and techniques described herein.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:
    receiving a request to search for a first data structure stored in a data repository, the first data structure associated with one or more search criteria;
    searching, an index in the data repository, for the first data structure, with searching based on the one or more search criteria;
    identifying, based on searching, the first data structure associated with the one or more search criteria;
    obtaining a definition for the first data structure;
    obtaining information indicative of one or more second data structures that are referenced by the first data structure;
    generating data for an interface, wherein the interface, when presented on a computing device, comprises:
        a first portion including a representation of the definition for the first data structure, with the definition including (i) a name of the first data structure and (ii) names of fields for storage of data within the first data structure;
        a second portion including a first listing of the information indicative of the one or more second data structures that are referenced by the first data structure; and
        a third portion including a second listing of information indicative of one or more third data structures that reference the first data structure;
        wherein the second portion differs from the first portion and from the third portion; and
    sending the data for the interface to the computing device associated with the request to search.

2. The computer-implemented method of claim 1, wherein obtaining the information indicative of the one or more second data structures that are referenced by the first data structure comprises:
    parsing the definition for the first data structure; and
    determining, based on parsing, one or more references to the one or more second data structures in the definition.

3. The computer-implemented method of claim 1, further comprising:
    obtaining information indicative of one or more third data structures that reference the first data structure; and
    updating the interface with the information indicative of the one or more third data structures that reference the first data structure.

4. The computer-implemented method of claim 1, wherein the interface comprises a first interface, and wherein the method further comprises:
    generating a second interface, with a section of the second interface including an area for insertion of the one or more search criteria; and
    sending the second interface to the computing device;
    wherein receipt of the request to search (i) is received following sending of the second interface, and (ii) includes the one or more search criteria inserted into the area of the second interface.

5. The computer-implemented method of claim 1, wherein the method further comprises:
    generating an index for one or more data structures, wherein the one or more data structures are indexed at least partly based on one or more of (i) one or more definitions of the one or more data structures, and (ii) one or more attributes of the one or more data structures.

6. The computer-implemented method of claim 1, wherein the first data structure comprises a protocol buffer.

7. The computer-implemented method of claim 1, wherein the definition of the first data structure comprises information indicative of one or more of (i) a name of the first data structure, (ii) names of the fields for storage of data within the first data structure, and (iii) properties of the fields for storage of data.

8. The computer-implemented method of claim 1, wherein the actions of receiving, searching, identifying, obtaining the definition for the first data structure, obtaining the information indicative of the one or more second data structures that are referenced by the first data structure, generating and sending are performed by one or more processors on a server-side device.

9. The computer-implemented method of claim 1, wherein the search criteria comprises information indicative of one or more of (i) a name of the first data structure, (ii) one or more attributes of the first data structure, (iii) a name of a field included in the first data structure, (iv) a name of a file that comprises the definition of the first data structure.

10. A computer-implemented method comprising:
    receiving data for an interface that comprises one or more input elements for input of search criteria indicative of a first data structure that is stored in a data repository;
    receiving, through the one or more input elements in the interface, information indicative of the search criteria for the first data structure;

sending to a computing device the information indicative of the search criteria for the first data structure; and receiving, from the computing device and based on the search criteria, data for an updated interface, the updated interface comprising:

a first portion including a representation of a definition of the first data structure, with the definition comprising information indicative of one or more qualities of the first data structure;

a second portion including a first listing of information indicative of one or more second data structures that are referenced by the first data structure; and a third portion including a second listing of information indicative of one or more third data structures that reference the first data structure;

wherein the second portion differs from the first portion and from the third portion.

11. The computer-implemented method of claim 10, wherein the first data structure comprises a protocol buffer.

12. The computer-implemented method of claim 10, wherein the definition of the first data structure comprises information indicative of one or more of (i) a name of the first data structure, (ii) names of the fields for storage of data within the first data structure, and (iii) properties of the fields for storage of data.

13. The computer-implemented method of claim 10, wherein the search criteria comprises information indicative of one or more of (i) a name of the first data structure, (ii) one or more attributes of the first data structure, (iii) a name of a field included in the first data structure, (iv) a name of a file that comprises the definition of the first data structure.

14. One or more machine-readable media configured to store instructions that are executable by one or more processing devices to perform operations comprising:

receiving a request to search for a first data structure stored in a data repository, the first data structure associated with one or more search criteria;

searching, an index in the data repository, for the first data structure, with searching based on the one or more search criteria;

identifying, based on searching, the first data structure associated with the one or more search criteria;

obtaining a definition for the first data structure;

obtaining information indicative of one or more second data structures that are referenced by the first data structure;

generating data for an interface, wherein the interface, when presented on a computing device, comprises:

a first portion including a representation of the definition for the first data structure, with the definition including (i) a name of the first data structure and (ii) names of fields for storage of data within the first data structure;

a second portion including a first listing of the information indicative of the one or more second data structures that are referenced by the first data structure; and a third portion including a second listing of information indicative of one or more third data structures that reference the first data structure;

wherein the second portion differs from the first portion and from the third portion; and sending the data for the interface to the computing device associated with the request to search.

15. The one or more machine-readable media of claim 14, wherein obtaining the information indicative of the one or more second data structures that are referenced by the first data structure comprises:

parsing the definition for the first data structure; and determining, based on parsing, one or more references to the one or more second data structures in the definition.

16. The one or more machine-readable media of claim 14, wherein the interface comprises a first interface, and wherein the operations further comprise:

generating a second interface, with a section of the second interface including an area for insertion of the one or more search criteria; and sending the second interface to the computing device;

wherein receipt of the request to search (i) is received following sending of the second interface, and (ii) includes the one or more search criteria inserted into the area of the second interface.

17. An electronic system comprising:

one or more processing devices; and one or more machine-readable media configured to store instructions that are executable by the one or more processing devices to perform operations comprising:

receiving a request to search for a first data structure stored in a data repository, the first data structure associated with one or more search criteria;

searching, an index in the data repository, for the first data structure, with searching based on the one or more search criteria;

identifying, based on searching, the first data structure associated with the one or more search criteria;

obtaining a definition for the first data structure;

obtaining information indicative of one or more second data structures that are referenced by the first data structure;

generating data for an interface, wherein the interface, when presented on a computing device, comprises:

a first portion including a representation of the definition for the first data structure, with the definition including (i) a name of the first data structure and (ii) names of fields for storage of data within the first data structure;

a second portion including a first listing of the information indicative of the one or more second data structures that are referenced by the first data structure; and a third portion including a second listing of information indicative of one or more third data structures that reference the first data structure;

wherein the second portion differs from the first portion and from the third portion; and sending the data for the interface to the computing device associated with the request to search.

18. The electronic system of claim 17, wherein obtaining the information indicative of the one or more second data structures that are referenced by the first data structure comprises:

parsing the definition for the first data structure; and determining, based on parsing, one or more references to the one or more second data structures in the definition.

19. The electronic system of claim 17, wherein the interface comprises a first interface, and wherein the operations further comprise:

generating a second interface, with a section of the second interface including an area for insertion of the one or more search criteria; and sending the second interface to the computing device;

wherein receipt of the request to search (i) is received following sending of the second interface, and (ii) includes the one or more search criteria inserted into the area of the second interface.

* * * * *

UNITED STATES PATENT AND TRADEMARK OFFICE
CERTIFICATE OF CORRECTION

| | |
|---|---|
| PATENT NO. | : 8,612,451 B1 |
| APPLICATION NO. | : 13/076637 |
| DATED | : December 17, 2013 |
| INVENTOR(S) | : Jianjun Wen and Xinyu Tang |

It is certified that error appears in the above-identified patent and that said Letters Patent is hereby corrected as shown below:

Title Page, Column 2, Item (56) under "OTHER PUBLICATIONS", Line 14:
Delete "synroot" and
insert -- svnroot --, therefor.

Title Page 2, Column 1, Item (56) under "OTHER PUBLICATIONS", Line 2:
Delete "Memeory" and
insert -- Memory --, therefor.

Signed and Sealed this
Sixth Day of May, 2014

Michelle K. Lee
*Deputy Director of the United States Patent and Trademark Office*